United States Patent [19]

Stasko

[11] 4,249,159
[45] Feb. 3, 1981

[54] AIRCRAFT DOCKING SYSTEM

[76] Inventor: Thomas A. Stasko, 6806 N. 7th St., Phoenix, Ariz. 85014

[21] Appl. No.: 842,468

[22] Filed: Oct. 17, 1977

[51] Int. Cl.$^3$ .................. G08G 5/06; B64F 1/18; G08G 1/14
[52] U.S. Cl. .................. 340/26; 244/114 R; 340/38 P; 340/51; 364/424
[58] Field of Search .................. 340/23, 47, 26, 51, 340/27 NA, 31 R, 41 A, 22, 38 R, 38 P; 250/203 R; 244/114 R; 356/138, 153; 246/187 B; 114/261; 364/424

[56] References Cited

U.S. PATENT DOCUMENTS

| 3,035,246 | 5/1962 | De Palma | 340/38 R |
|---|---|---|---|
| 3,729,262 | 4/1973 | Snead et al. | 340/26 |
| 3,729,706 | 4/1973 | Hein | 340/41 A |
| 3,775,741 | 11/1973 | Zechnowitz et al. | 340/26 |
| 3,821,697 | 6/1974 | Brown | 340/26 |
| 3,885,876 | 5/1975 | Konopka | 340/26 |
| 4,015,235 | 3/1977 | Demaine et al. | 340/26 |
| 4,184,655 | 1/1980 | Anderberg | 340/26 |

Primary Examiner—James J. Groody
Attorney, Agent, or Firm—W. R. Hulbert

[57] ABSTRACT

An aircraft ground guidance and parking system consisting of a lighting display unit adapted to be mounted at a parking station pointing directly down the on-course center line to be followed by the incoming taxying aircraft and at an elevation for viewing from the cockpit of the aircraft, the lighting display unit including an array of traffic lights, a scanning system for reading successive indicia on the side of the aircraft as it passes by a location at the parking station and thereby generating successive signals, and a control unit responsive to the signals to illuminate the traffic lights in successively different modes of operation to signal the pilot of the aircraft when to slow and to halt the aircraft, the lighting display unit further including an optical system for emitting narrow beams of light visible to the pilot of the aircraft through predetermined sectors at angles on both sides of the on-course center line and which selectively appear to extinguish or illuminate to indicate to the pilot his lateral relationship to the center line as he taxies toward the parking station.

10 Claims, 10 Drawing Figures

FIG 5
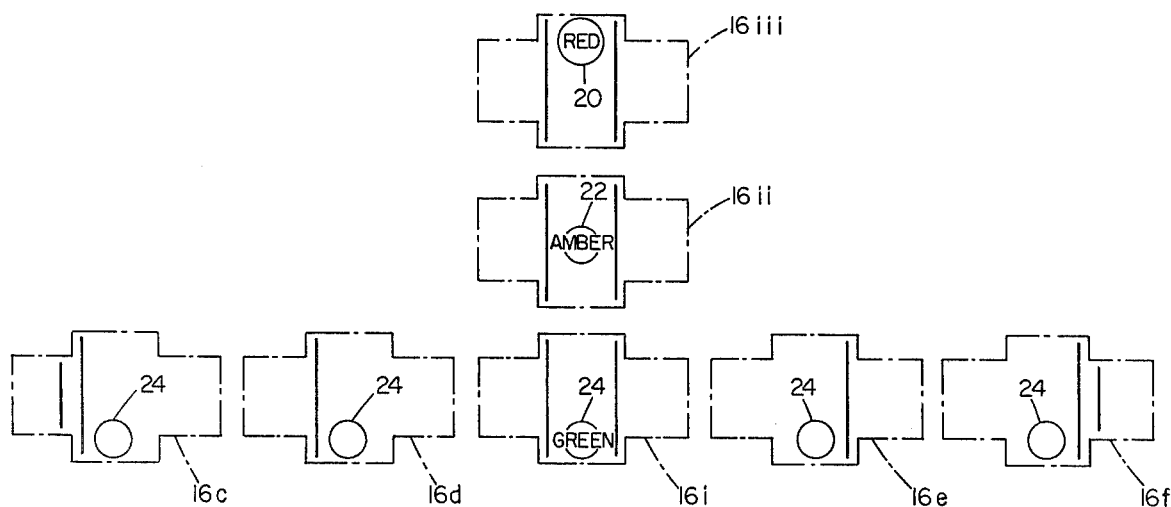
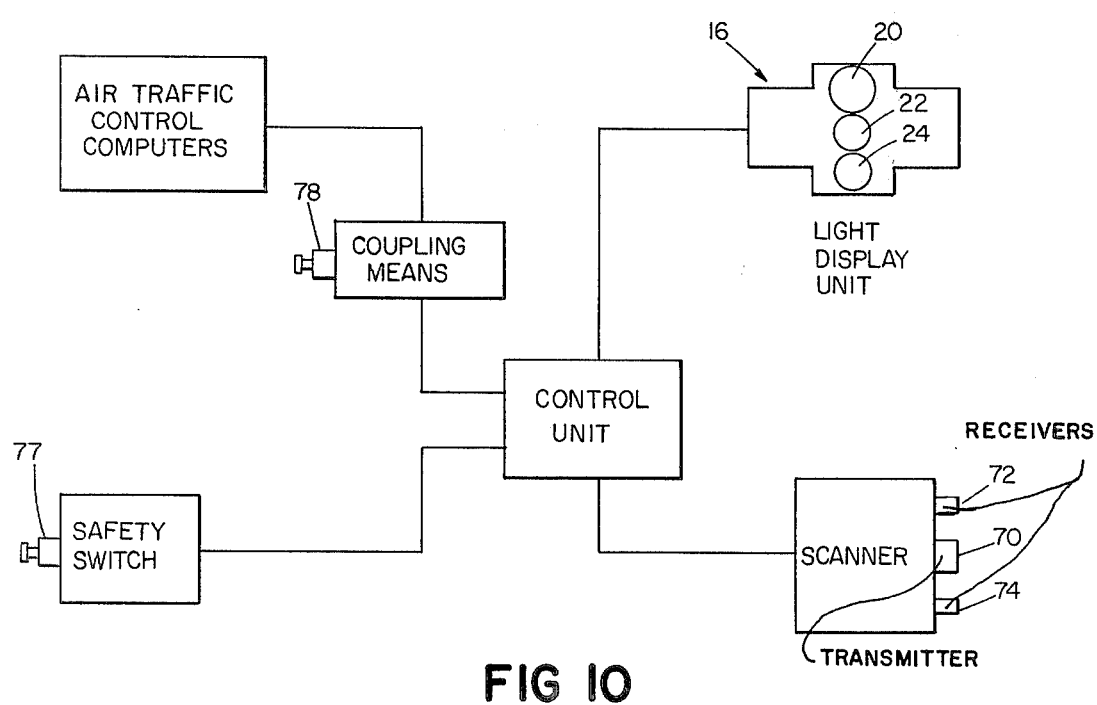
FIG 10

AIRCRAFT DOCKING SYSTEM

BACKGROUND OF THE INVENTION

This invention relates to a ground guidance and control system for docking and undocking aircraft at the gate at an airport terminal.

The usual system in use in the United States and many foreign countries for guiding taxying aircraft to parking position employs a painted line on the taxiway which the pilot follows visually with the aid of manual signals from ground personnel to keep him on course and to tell him when to stop. At departure time he must call ground control by radio telephone for verbal clearance to start engines and push back from the gate.

Various more sophisticated systems have been proposed, for example those shown in U.S. Pat. Nos. 3,674,226, 3,729,262, 3,775,741 and 3,821,697. Still others are described in, for example, American Airlines Flight Manual - Part I, Sec. 4, page 73 (Oct. 17, 1973); id. Part II, 19:5 (May 5, 1972); id. Part I, Sec. 4, page 69 (Apr. 23, 1973); and id. Part I, Sec. 4, page 70 (Jan. 18, 1974).

All systems so far proposed, so far as I am aware, suffer from one or more drawbacks. For example they may employ expensive and often undependable and nondurable underground pressure sensors which give signals of the aircraft's position; or they may be incapable of ready adaptation to different aircraft; or they may require the pilot to respond visually to signals simultaneously transmitted from different directions or from different distances; or they may require that the pilot's eyes be positioned on a precise line passing through the center of the windshield, thus making the system unreliable in any other position. None of them now in use, so far as I am aware, makes it possible to dispense with any ground personnel and none of them is compatible with the air traffic control computers whereby, by appropriate programming of the computers, the pilot may be signaled automatically when to start engines and when to push back and/or taxi from the gate for departure.

BRIEF SUMMARY OF THE INVENTION

In accordance with the invention I provide an aircraft ground guidance and parking system featured by a novel lighting display unit adapted to be mounted at a parking station pointing directly down the on-course center line to be followed by the incoming taxying aircraft and at an elevation so as to be visible to occupants of the airplane's cockpit.

The lighting display unit comprises an array of more than one traffic light of different characteristics preferably being three in number and colored red, amber and green, facing the incoming aircraft, a control unit for selectively controlling the lights, means for scanning a series of successive indicia on a lateral surface of the aircraft as it passes by a predetermined location at the parking station and thereby generating successive signals which are a function of successive positions of the aircraft as it closes on the parking station, and means for transmitting the generated signals to the control unit, the latter being responsive to the signals selectively to illuminate one or more of the traffic lights in predetermined modes of operation to signal the pilot of the aircraft when to slow and to halt the aircraft.

The novel system preferably includes a manual control associated with the control unit to permit ground personnel to override signals generated by the scanning means.

In accordance with a further feature, the lighting display unit includes means on either side of the array of traffic lights for emitting narrow beams of light visible as distinct light bars to the pilot of the aircraft only as the aircraft passes through predetermined sectors at angles on both sides of the oncourse center line and which selectively appear to extinguish or illuminate to indicate to the pilot his lateral relationship to said line as he taxies toward the parking station. Preferably the distinct light bars are vertical and some are of different lengths than others, only the two most closely adjacent to the array, one being on each side thereof, being visible to the pilot when the taxying aircraft is exactly on course on the center line.

In the preferred embodiments, the two most closely adjacent light bars are distinctly longer than the other light bars and there are two sets of three other light bars each set being adjacent and outboard of one of the longer light bars; the light emitting means is so disposed and arranged that additional bars of the sets of lights appear to illuminate successively the further off course the aircraft to the corresponding side of the center line and to extinguish successively as the course is corrected; the light bars are visible through only a narrow sector in the horizontal plane while being visible through a wide sector in the vertical plane so as to be viewable by ground personnel from the ground in front of the display unit; the lighting display unit includes a housing, a light source within the housing, and internal baffles and slotted openings in the housing defining the light emitted by the source within to the distinct beams seen as light bars.

In another aspect the system of the invention includes means coupling the control unit to an existing computerized air traffic control system, whereby the traffic lights may be automatically activated to signal the pilot when to start engines and leave the parking station without the intervention of voice commands; this also has a manual override, 78 (FIG. 10), for use by ground personnel.

BRIEF DESCRIPTION OF THE DRAWINGS

FIG. 5 illustrates some of the signal images seen by the pilot at different positions after making his turn off the taxiway and as he approaches his parking position as illustrated in FIG. 1;

FIG. 10 is a block diagram showing the relationship of the system components with each other.

DETAILED DESCRIPTION OF PREFERRED EMBODIMENT

LATERAL GUIDANCE SYSTEM

Figure 1:
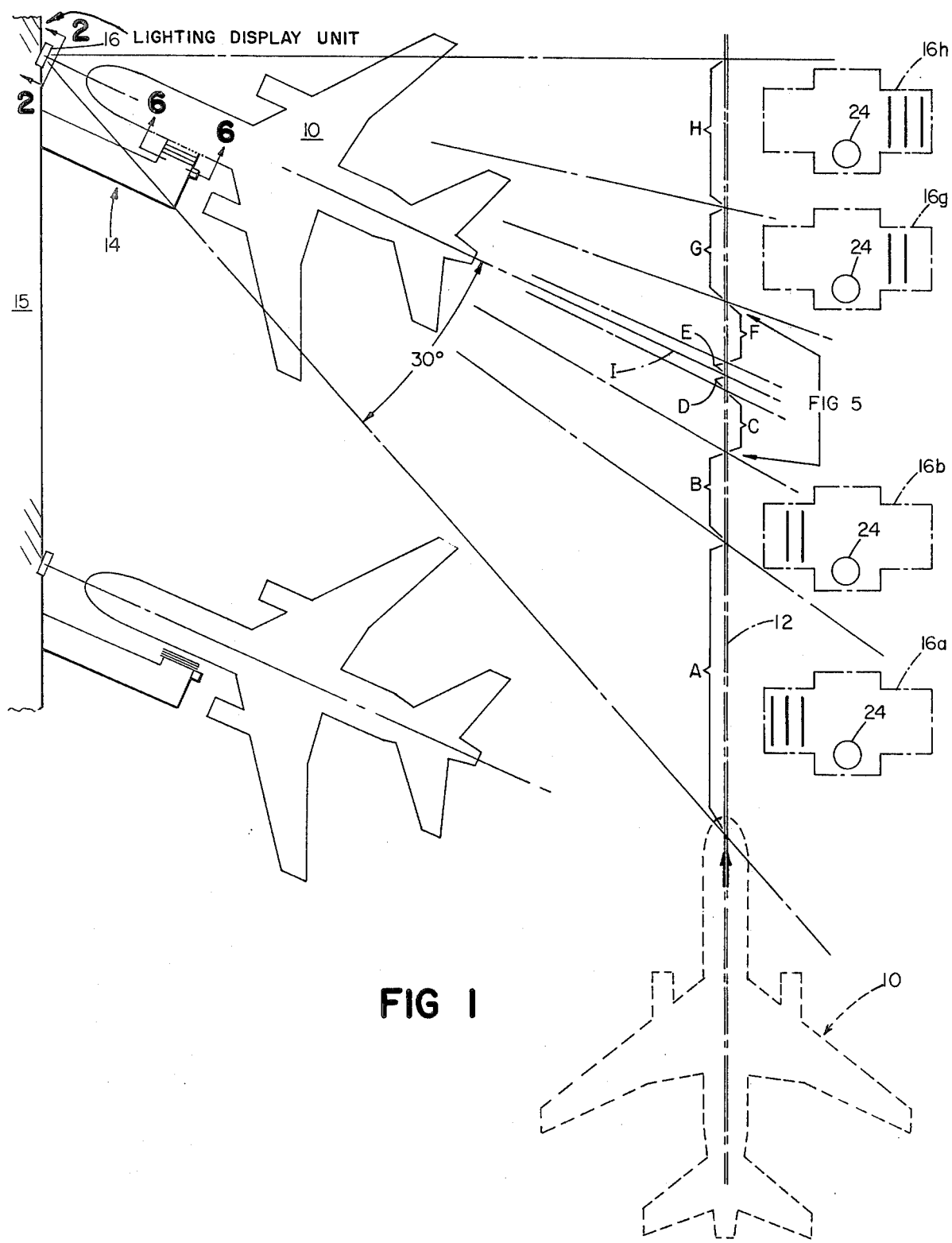
FIG. 1 is a diagrammatic representation showing an aircraft being guided from a taxi-way to parking position at a jet bridge at the terminal gate by means of the system of the invention.

The general principle employed by the novel system of the invention for guiding the aircraft to its parking location is shown in FIG. 1. An aircraft 10 is shown in broken lines taxying on a taxi-way 12, to turn off, approach and park at a gate position 14 of terminal 15. The light display unit 16 of the invention is mounted at the gate position 14 so as to face the incoming aircraft, at an elevation of 15' to 30' (5 m to 10 m±) as seen at the top of FIG. 1. The images which are seen by the pilot at various locations on the way are illustrated by diagrammatic representations 16a, 16b, 16g and 16h in FIG. 1, and similarly in FIG. 5, as will become clear from what follows.

Figure 2:
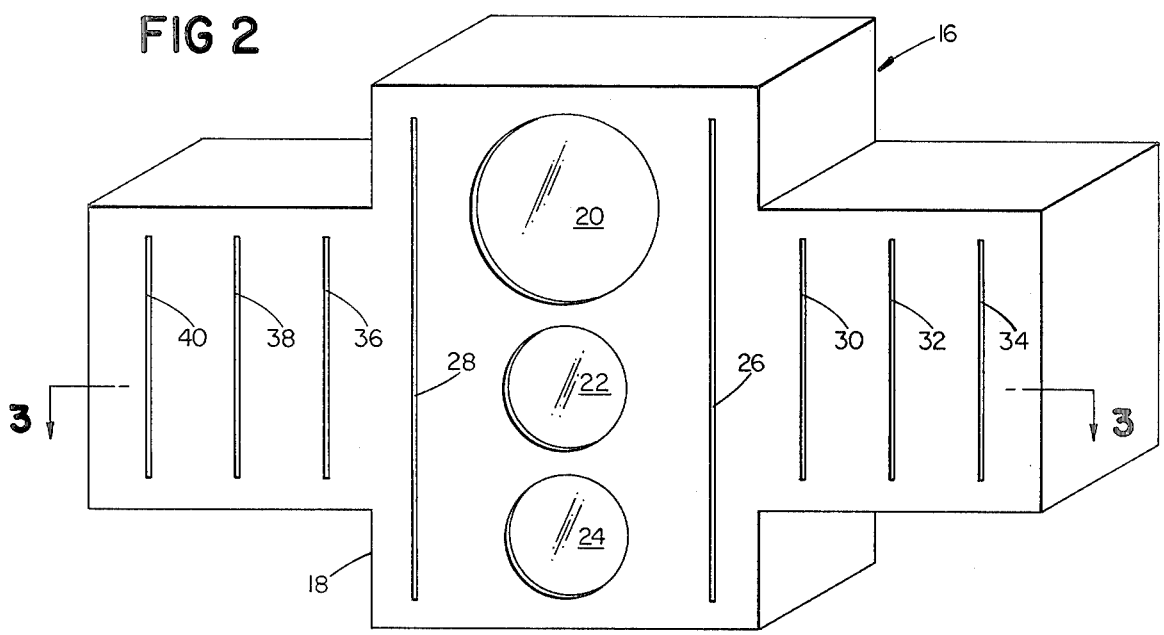
FIG. 2 is a perspective view of the light display unit which transmits visual signals to the pilot.
Figure 3:
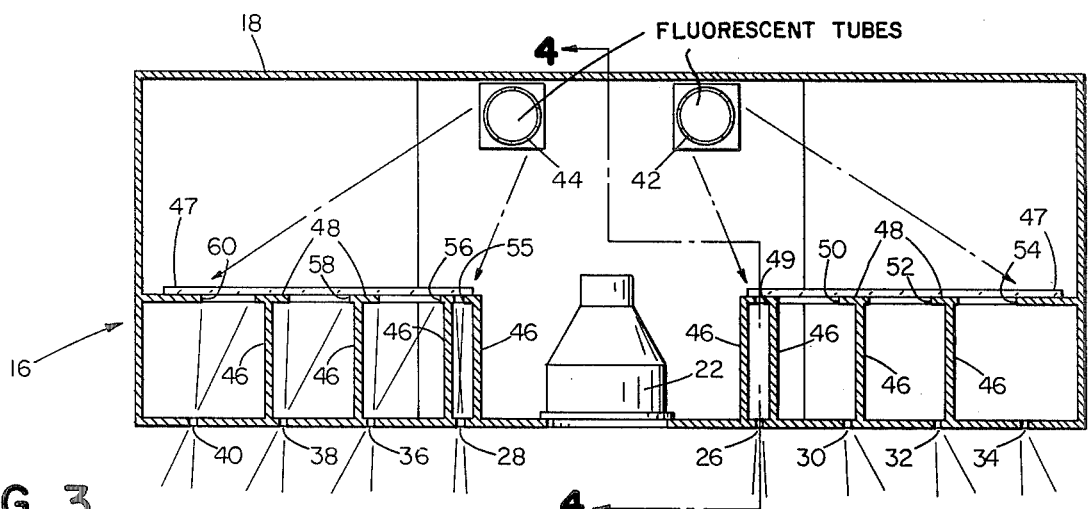
FIG. 3 is a section on line 3—3 of FIG. 2.
Figure 4:
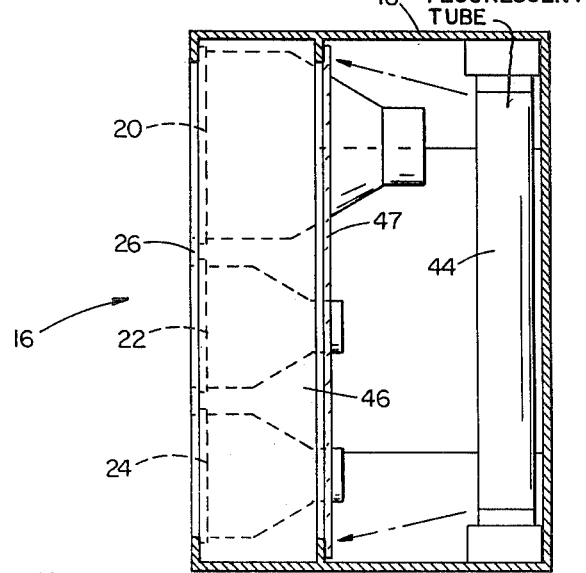
FIG. 4 is a section on line 4—4 of FIG. 3.
Figure 6:
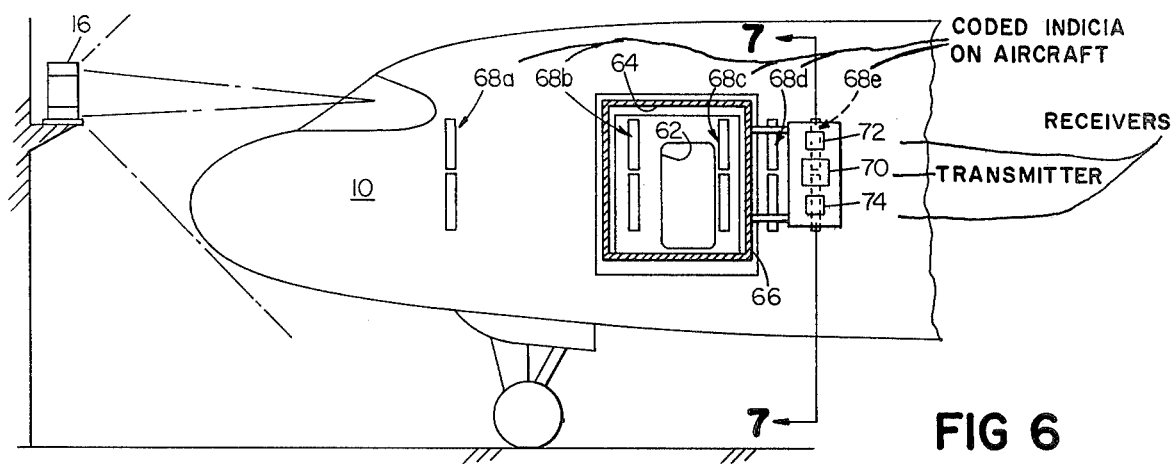
FIG. 6 is a section on enlarged scale taken on line 6—6 of FIG. 1 illustrating the operation of the scanner which senses and signals the position of the docking aircraft, showing diagrammatically the coded indicia applied to the skin of the aircraft.
Figure 7:
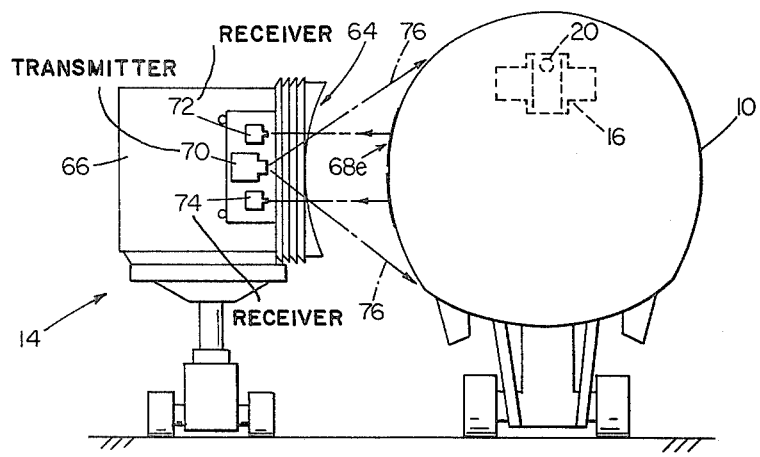
FIG. 7 is a section taken on line 7—7 of FIG. 6.

The construction of the unit 16 is shown in FIGS. 2-4. It comprises a cruciform housing 18 in the center of which is a vertical array of three colored lights. The topmost and largest light 20 is red; the center light 22 is amber and the bottom light 24 is green. Standard highway traffic signals may be used. On either side of the array of colored lights are vertical slots which, when illuminated, produce bars of white light selectively visible or invisible from the aircraft, depending on its angular orientation to the display unit. Closest to the center and adjacent the array of traffic lights are two elongated slots, slot 26 on the right (as viewed in FIG. 2) and slot 28 on the left. Outboard of slots 26, 28 are two series of three shorter vertical slots, 30, 32 and 34 on the right, and 36, 38 and 40 on the left.

Housed in the rear of the slots are light sources, such as vertically mounted fluorescent tubes 42, 44. Interior longitudinal baffles 46 and transverse baffles 48 subdivide the housing 18. Light from tubes 42, 44 illuminates translucent screen 47 which is visible through slots 30–'but only through predetermined sectors because of the dimensions of slotted openings 49, 50, 52 and 54, at the right, and 55, 56, 58 and 60, at the left. The sectors of visibility are indicated by the angled lines in FIG. 3 and also in FIG. 1. Thus, the lighted screen 47 will be seen through slots 26 and 28 as vertical bars of light only by an observer directly in front of the unit 16, while from such position no light will be seen through any of the other slots. As the observer moves further to one side or the other from a position horizontally perpendicular to the front of the unit 16, he sees first one, then two and then three light bars as the screen becomes visible through additional slots and the longer light bars of slots 26, 28 disappear. The arrangement is such that one or the other of the longer light bars will appear to extinguish because of even a minor variation from true course.

It is readily apparent that this lighting unit provides an easily remembered, logical, signaling system, utilizable to bring a taxying airliner onto a desired path of travel to the gate and to keep it on course as it taxies.

Referring now to FIGS. 1 and 5 a taxying aircraft is shown in broken lines moving in the direction of the arrows on the taxiway. As soon as it commences traversing sector A the pilot, looking toward the unit 16, will see three vertical bars of light produced by light visible through slots 36, 38 and 40 as indicated at 16a. When the aircraft enter sector B the outermost bar of light is extinguished, as in 16b, by reason of the slotted interior of the light unit. Upon arrival at sector C light ceases to become visible through slot 38 but remains visible through slot 36 while, for the first time, a longer bar of light appears through slot 28 (16c, FIG. 5). The pilot now knows that he is almost directly opposite the unit 16 and prepares to make his left turn toward the gate. During the turn the nose of the aircraft will move as indicated by broken lines into sector F wherein the pilot will see the image shown as 16f, indicating the nose of the aircraft is off course to the right, which is to be expected because of the turning radius of the aircraft and the distance between the nose wheel and the main landing gear. Upon completion of the turn toward the gate, if he is on course, the pilot will see the image 16i in which only light bars 26 and 28 and the green light will be visible. If he should stray too far to either side a warning sequence occurs as indicated by successive images 16f, 16g and 16h, or 16a, 16b and 16c, and he will make corresponding corrections in his course.

It will be noted that the internal baffling of unit 16 is such that the light bars produced will be visible accurately through the indicated sectors for all positions of the aircraft along the taxiway and between the taxiway and the gate. To accomplish this it is necessary to know the distance between the position at which the unit 16 is to be mounted and the taxiway used at the airport on which the system is to be installed. It is then a simple matter of geometry to establish the angles involved and to place the baffles and slotted openings accordingly. It will be noted that while the slots must be arranged to produce visibility of individual bars at critical angles of view in the horizontal plane they should have a wide angle vertically so as to be viewable from the cockpits of aircraft of various sizes and at various distances and also from the ground so that their proper functioning can be checked by ground personnel.

Examples of suitable angular limits follow. As indicated in FIG. 1, if taxiway 12 is 360' (115 m±) from terminal 15, all three of one of the series of shorter bars of light should become visible at an angle of 30° from the on-course center line (i.e. the line perpendicular to the center of the display unit) and should remain visible from any point within sector A. Sectors B and C can be substantially smaller than Sector A, roughly of the order of 15° for Sector C and 8° for Sector B, in each case being measured from the on-course center line. Sector D, however, must be very narrow, and it is recommended that the total width of the on-course signal (Sector D and Sector E) at a distance of 360' (115 m±) from the display unit be only of the order of 18" (0.5 m±). As already indicated, the geometry of the unit's interior must be such as to extinguish the outermost light bar when the aircraft passes from Sector A into Sector B, and similarly with respect to the remaining short bars, while if the aircraft is exactly on target, i.e. in Sectors D and E, only the two long bars will be visible (apart, of course, from the go-ahead green light 24 as described below). Vertical angular width of the visual signals from the slots, as already mentioned, should be wide, of the order of 140°, so as to be visible from cockpits of varying elevation and also by ground personnel walking in front of the display unit.

LONGITUDINAL GUIDANCE SYSTEM

The system of the invention is also adapted to indicate to the pilot his stopping position with the aircraft passenger door opposite the jet bridge, the position shown in full lines in the upper view of FIG. 1. As the aircraft taxies along the taxiway and commences its traverse of Sector A the traffic lights in the unit 16 also become visible. Ground personnel will have activated the lower, green light 24 into its slow (56± cycles/min.) flashing mode of operation (the generally accepted signal for aircraft on the ground to taxi), clearing the aircraft to approach the parking area. After making his left turn off the taxiway, and while maintaining course by reference to the light bars, the pilot continues to observe the flashing green light until he is a predetermined distance from the stop point, say 20' (6 m±), where the flashing green light becomes steady green. At 10' (3 m±) the green extinguishes and slow flashing amber appears, indicating the area is still clear for docking. At 5' (1.5 m±) the slow flashing amber turns to rapid (112± cycles/min.) flashing amber and at $2\frac{1}{2}'$ (75 m±) it becomes steady amber, telling the captain that he has only that short distance remaining to the stop point. At the stop point amber light is extinguished and the red light appears, and this is where the aircraft comes to a halt. The following describes the systems and mechanisms for accomplishing this result.

To activate the flashing green light ground personnel press a spring loaded safety switch 77 (FIG. 10) which must be held open for the described sequence to occur. At any point, should a dangerous situation arise, the switch may be released and the red light alone will appear telling the pilot to stop.

Referring now to FIGS. 6–9, the object is to halt the aircraft 10 with its passenger door 62 opposite the exit 64 from the jet bridge 66. To accomplish this end the skin of the aircraft is painted, or otherwise provided with coded light-reflecting indicia 68a, 68b, 68c, 68d, 68e at suitable locations for scanning by visible or invisible light from transmitter 70 and to reflect the same back to receivers 72, 74.

Figure 8:
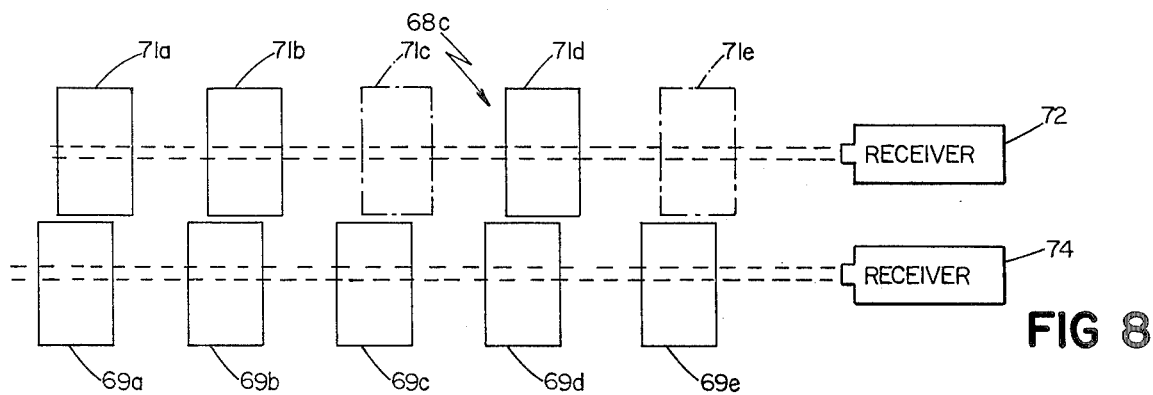
FIG. 8 is a diagrammatic representation of one coded indicia applied to the skin of the aircraft, at one longitudinal location.
Figure 9:
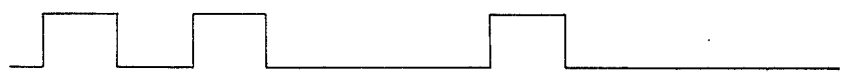
FIG. 9 is a diagrammatic representation of the electrical pulse signals generated by the scanner, when reading the indicia of FIG. 8.
Figure 9:
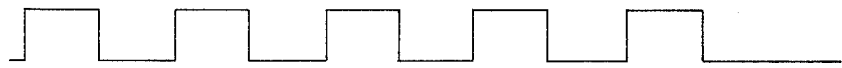

The coded indicia each consist of a five-position pattern of upper and lower, 1" (2.5 cm±) wide, light-reflecting stripes, as shown for symbol 68c in FIG. 8, receivers 72, 74 reading the upper and lower stripes, respectively. The lower series of stripes 69a, 69b, 69c, 69d, 69e are present for each indicia, as are the first two upper stripes 71a, 71b. The remaining upper stripes 71c, 71d, 71e differ for each indicia; for indicia 68c only stripe 71d is applied. The lower indicia are shifted forward of the upper indicia 25% of the stripe width so as to assure that the logic circuitry has read the lower stripe when encountering an associated upper stripe. The transmitter is arranged to flood the side of the aircraft, so-to-speak, with transmitted radiation of predetermined frequency, as indicated by arrows 76. The receivers sense radiation reflected from the upper stripes 71a–71e and lower stripes 69a–69e, and with the help of Schmitt Triggers in the control unit (FIG. 10), convert the same into square waves, as shown in FIG. 9, which, in turn, command logic circuitry in the control unit (FIG. 10) to operate the lights 20, 22, 24. The indicia 68a–68e are horizontally spaced at successive distances from each other of 20' (6 m±), 10' (3 m±), 5' (1.5 m±) and $2\frac{1}{2}'$ (1 m±). When the receivers sense the passing of the stripe pattern of indicia 68a the logic circuitry shifts the operation of the green light from flashing to steady. When indicia 68b is sensed the green light is extinguished and the amber light commences slow flashing. Next the passing of indicia 68c changes the amber flashing to rapid; and then to steady amber when indicia 68d appears. When indicia 68e is opposite the receivers the red light is activated, telling the captain to stop. The receivers are in duplicate, as indicated, so that a comparison between the clock symbol (lower FIG. 9) can be made with the key symbol (upper FIG. 9) to reduce the chance of error from false signals and each is arranged to focus rather narrowly on the stripes (symbol) within the indicia being sensed. Since the jet bridge will have been adjusted in advance to the height of the passenger door of the aircraft which will dock there, the scanner elements will be automatically set at a predetermined height to correspond with that of the symbols affixed the skin of the aircraft. The upper and lower stripes are each 12 inches high to allow for height variations between particular aircraft. This makes possible the use of the system for many different types of aircraft, from Boeing 747s down.

The technology for scanning a moving vehicle is known per se. Suitable transmitters and receivers can be readily adapted from Micro Switch model FE-MLS2A, a product of Honeywell which is capable of accurate scanning up to 30 mph. When utilizing this model the light emitter lens should provide a wide angle beam to flood the side of the aircraft. The receivers should be fitted with lenses to confine the area scanned to about $\frac{1}{2}$ in.$^{2\,2}$ (1.5 cm$^2$±) at a distance of $3\frac{1}{2}'$ (1 m±) and preferably are provided with shields to eliminate entry of stray light. The logic circuitry within the control unit is adapted to the square wave signals of FIG. 9 so as to produce an appropriate sequence of electrical signals to control the traffic lights, as above described. By the use of two distinct symbols at each longitudinal location on the aircraft skin and two scanning receivers, the logic circuitry performs a cross check, assuring proper recognition of longitudinal position and rejection of false signals.

DEPARTURE GUIDANCE SYSTEM

As earlier indicated, the novel system of the invention is adapted to be placed in communication with the air traffic control computers in which is stored information on arriving, departing and in transit flights and which informs the controllers of traffic overloads anywhere along the line which would delay departures. Currently, prior to departure, the captain of an aircraft receives clearance delivery by radio telephone based upon information obtained by an individual controller from the computer which already has stored pertinent information on the particular flight. The captain then contacts ground control for clearance to start engines and to push back and/or taxi from the gate. When traffic is heavy and weather conditions poor there may be delay or failure of communication whereby Ground Control prematurely authorizes engine start and there then follows long delay for the remaining clearances with resultant waste of expensive fuel and needless engine wear.

The system of the present invention is adaptable to be placed into electronic communication with the air traffic control computers which can be programmed to signal push-back, engine start and/or clearance to taxi from the gate without voice command.

From the block diagram of FIG. 10 it will be seen that the control unit for the lighting display unit 16 can be linked to the Air Traffic Control computers which can issue appropriate commands to produce the following sequence of events.

The lighting sources 42, 44, which produce the illuminated elongated white bars are extinguished. The red light 20 is maintained on during the entire sequence. When five minutes remain to engine start the amber light 22 appears with a steady light. At the expiration of the five minutes period the amber light changes from steady to slow flashing, indicating authorization to the flight and ground crew to push-back the aircraft from the gate. Authorization for engine start and/or to commence taxying is indicated by extinguishing the amber light and lighting the green light 24 in slow flashing mode. The sequence can be initiated in any desired fashion, as by the pushing of a button 78 in the control tower, and can be halted at any time by voice command. Under normal operating conditions a significant reduction in the volume of voice communications can be expected and, under all conditions, a substantial reduction in the number of aircraft holding, and their time of holding with engines idling, on the field will result from proper use of the novel system.

Other embodiments are within the scope of the description and claims. For example, the vertical light bars could be replaced by beams of light of other shapes, which selectively extinguish and illuminate to indicate lateral position. And different traffic light signals could be employed to display longitudinal position.

What is claimed is:

1. An aircraft ground guidance and parking system comprising a lighting display unit adapted to be mounted at a parking station pointing directly down the on-course center line to be followed by the incoming taxying aircraft and at an elevation for viewing from the cockpit of the aircraft, said lighting display unit comprising:

an array of more than one traffic light of different characteristics facing the incoming aircraft, a control unit for selectively controlling said lights, means for scanning a series of successive indicia on a lateral surface of the aircraft as it passes by a predetermined location at said parking station and thereby generating successive positions of the aircraft as it closes on said parking station, and means for transmitting said signals to said control unit, said control unit being responsive to said signals selectively to illuminate one or more of said traffic lights in predetermined modes of operation to signal the pilot of the aircraft when to slow and to halt the aircraft.

2. The system of claim 1 including a manual control associated with said control unit to permit ground personnel to override the signals generated by said scanning means.

3. The system of claim 1 wherein said lighting display unit includes means on either side of said array for emitting narrow beams of light visible as distinct light bars to the pilot of the aircraft only through predetermined sectors at angles on both sides of said on-course center line and which selectively appear to extinguish or illuminate to indicate to the pilot his lateral relationship to said line as he taxies toward said parking station.

4. The system of claim 3 wherein said narrow beams of light are vertical light bars located on either side of said array, some of which are of different lengths than others, only the two most closely adjacent to said array being visible to the pilot when the taxying aircraft is on course on said center line.

5. The system of claim 4 wherein said two most closely adjacent light bars are distinctly longer than the other light bars and wherein there are two sets of three other light bars each set being adjacent and outboard of a longer light bar.

6. The system of claim 5 wherein said light emitting means is so disposed and arranged that additional bars of said sets of lights appear to illuminate successively the further off course the aircraft to the corresponding side of said center line and to extinguish successively as the course is corrected.

7. The system of claim 3 wherein said light emitting means is so disposed and arranged that said narrow beams of light are visible through only a narrow sector in the horizontal plane while being visible through a wide sector in the vertical plane so as to be viewable from the ground in front of said display unit.

8. The system of claim 3 wherein said lighting display unit includes a housing, a light source, a translucent screen illuminated by said source, and baffles and slotted openings arranged to limit visibility of said screen to said predetermined sectors.

9. The system of claim 1 including means coupling said control unit to an existing computerized air traffic control system whereby said traffic lights may be automatically activated to signal the pilot when to start engines and leave said parking station without the intervention of voice commands.

10. The system of claim 1 wherein said array comprises a set of traffic lights, one red, one amber and one green.

* * * * *

UNITED STATES PATENT AND TRADEMARK OFFICE
CERTIFICATE OF CORRECTION

PATENT NO. : 4,249,159

DATED : February 3, 1981

INVENTOR(S) : Thomas A. Stasko

It is certified that error appears in the above-identified patent and that said Letters Patent are hereby corrected as shown below:

In claim 3, column 8, line 4, the phrase "on either side of said array" should be deleted.

In claim 3, column 8, line 5, the phrase "as distinct light bars" should be deleted.

Signed and Sealed this

Eleventh Day of August 1981

[SEAL]

Attest:

Attesting Officer

GERALD J. MOSSINGHOFF

Commissioner of Patents and Trademarks